United States Patent [19]

Brown

[11] 3,996,167
[45] Dec. 7, 1976

[54] ANTISTATIC SURFACES

[75] Inventor: Peter Thomas Brown, Newmarket, England

[73] Assignee: Ciba-Geigy Corporation, Ardsley, N.Y.

[22] Filed: Nov. 5, 1974

[21] Appl. No.: 521,124

[30] Foreign Application Priority Data

Nov. 9, 1973 United Kingdom ............ 52019/73

[52] U.S. Cl. .............................. 252/513; 428/323; 252/512; 252/515
[51] Int. Cl.² ...................... H01B 1/02; H01C 1/02
[58] Field of Search ...................... 428/49, 50, 323; 260/37 M; 252/513, 512, 515

[56] References Cited

UNITED STATES PATENTS

| 2,321,587 | 6/1943 | Davie et al. | 252/513 |
| 2,718,506 | 9/1975 | Elleman | 252/513 |
| 2,901,455 | 8/1959 | Jurras | 260/37 M |
| 3,083,169 | 3/1963 | Ueda | 252/512 |
| 3,247,299 | 4/1966 | Zaha | 428/49 |
| 3,770,482 | 11/1973 | Millar et al. | 428/323 |

*Primary Examiner*—Benjamin R. Padgett
*Assistant Examiner*—Josephine Lloyd
*Attorney, Agent, or Firm*—Luther A. R. Hall

[57] ABSTRACT

An antistatic surfacing material comprises a curable synthetic resin, such as a polyepoxide, polyester or polyurethane, and 1–20g, per liter of total composition, of metal fibers having a length of 1.5–10 mm and an average diameter of at most 25μm.

The use of such very fine fibers in short lengths results in materials the electrical conductivities of which are consistent in successive batches.

11 Claims, No Drawings

ANTISTATIC SURFACES

This invention relates to antistatic surfaces, to methods for their manufacture, and to compositions used therein.

It is well known that in certain locations, such as working and storage areas in which inflammable substances are handled, it is highly desirable to prevent build-up of static electricity on the surfaces, especially floors. This object is achieved by making the surface 'antistatic', that is to say, electrically conductive. However, if the surface is made too highly conductive there is a danger that it could become 'live' due to faulty insulation in electrical apparatus or wiring in contact with that surface.

There is therefore a need for a surfacing material, especially a flooring, which is not too highly conductive yet which is sufficiently conductive to prevent the build-up of static electricity. Typical suitable floorings are the subject of a publication by the British Department of Health and Social Security entitled "Hospital Technical Memorandum No. 2 — Antistatic Precautions; Flooring in Anaesthetising Areas", published by Her Majesty's Stationery Office, 1971. The recommended limits of electrical resistance for floors given in that publication are:

Upper limit — average value not exceeding 2MΩ between two separate electrodes spaced 600 mm apart, with no individual reading exceeding 5 MΩ

Lower limit — average value not less than 50 kΩ, measured as above, with no individual reading less than 20 kΩ.

Hitherto, floors have been rendered sufficiently conductive by incorporating carbon black or powdered metals. Then materials, however, tend to rub off from the surface of the floor and hence give rise to difficulties in cleaning. In addition, incorporation of either usually gives a dull, unattractive finish to the floor.

It is well known that metal fibres may be incorporated in plastics matrices in order to give increased strength and/or to render them electrically conducting: see, for example, British patent specification Nos. 801826, 819809, 888270, 1174292, and 1261560. Hitherto, however, on incorporating metal fibres into plastics materials to be used for surfacing in order to impart antistatic properties, it has been difficult to obtain reproducible results, the electrical conductivity of successive batches of the surfacing material varying enormously. It has now been found that, by incorporating very fine metal fibres in short lengths and in certain proportions into the plastics material, as the sole component having a significant electrical conductivity, a much greater degree of control over the conductivity of the resulting material is possible, the results obtained being predictable and consistent over successive batches of the surfacing material.

The present invention accordingly provides a composition suitable for use as an antistatic surfacing material, comprising a curable synthetic resin and from 1 g to 20 g, preferably from 1 g to 12 g, and especially from 4 to 8 g, per litre of the total composition, of metal fibres, substantially all of these fibres having a length of from 1.5 to 10 mm, especially of from 2.0 to 4.0 mm, and an average diameter of at most 25 μm, preferably of from 8 to 15 μm. It also provides an electrically conductive surface comprising a cured resin containing from 1 to 20 g, preferably from 1 to 12 g, and especially from 4 to 8 g, per liter of the total composition, of such metal fibres.

It further provides a method for coating a surface to provide an antistatic finish which comprises the steps of
i. incorporating from 1 to 20 g, preferably from 1 to 12 g, and especially from 4 to 8 g, of such metal fibres per liter of the total composition of a curable resin composition,
ii. applying the mixture to the surface, and
iii. curing the resin.

Throughout this Specification and the claims appended thereto, volume in reference to a powder or granular material means the true, i.e., void-free, volume. "Curing" includes "allowing to cure". The expression "total composition" means the composition containing the curing agent, if any be present, for the curable synthetic resin.

Fibres suitable for use in accordance with the present invention may be of any suitable workable metal, such as niobium, nickel, tungsten, iron, aluminium, carbon steel, chrome nickel alloys, and especially stainless steel. Such fibres, which may be prepared by known methods of drawing or extruding metal rods or wires, and may, if necessary, be cut to the desired length, are commercially available.

The amount of metal fibres needed to give the required electrical resistance will depend upon which metal is used, their length and diameter, and the nature of the other components in the mixture. We have found that additions in the range 6 to 7 g per liter of total composition, when fibres 3 mm in length and 12 μm in diameter are used, give particularly good results; the range of addition suitable for fibres of any given diameter is comparatively narrow — typically, ± 10% calculated on the weight of the fibres — but the optimum level for a particular circumstance may be readily determined by those skilled in the art. Levels of addition giving an average electrical resistance within the range 50 kΩ to 2 MΩ, measured between two electrodes placed 600 mm apart, are particularly preferred. It should be understood that these measurements of electrical resistance refer to those obtained under clean, dry conditions, with the surface in the state in which it is to be used: measurements on terrazzo flooring, for example, are taken after the surface of the flooring has been ground to a smooth finish.

The curable resins used may be of any type, but we prefer to use cold-curing resins, and particularly those currently used in flooring, such as polyesters, polyurethanes, and especially epoxide resins.

Polyurethanes suitable for use in the present invention include those containing a mixture of a liquid polyester or polyether resin having a hydroxyl value between 1.7 and 12% and a liquid polyisocyanate, preferably one based on bis(4-isocyanatophenyl)methane.

Suitable polyesters include liquid unsaturated polyester resins containing reactive unsaturated monomers such as styrene, vinyltoluene, or an ester of acrylic acid. They are used in conjunction with a source of free radicals as a catalyst for their polymerisation, such as a peroxide.

Epoxide resins, i.e., substances containing on average more than one 1,2-epoxide group per molecule, which may be employed are preferably those containing terminal 1,2-epoxyethyl groups, especially as 2,3-epoxypropyl groups directly attached to an oxygen, nitrogen, or sulphur atom.

As examples of such resins may be mentioned polyglycidyl esters obtainable by reaction of a compound, per molecule, two or more free carboxyl groups, with epichlorohydrin or glycerol dichlorohydrin in the presence of an alkali. Such polyglycidyl esters may be derived from aliphatic polycarboxylic acids, cycloaliphatic polycarboxylic acids, and from aromatic polycarboxylic acids.

Further examples are polyglycidyl ethers obtainable by reaction of a compound containing, per molecule, at least two free alcoholic hydroxyl or phenolic hydroxyl groups with epichlorohydrin or glycerol dichlorohydrin under alkaline conditions or, alternatively, in the presence of an acidic catalyst and subsequent treatment with alkali. These ethers may be derived from acyclic alcohols such as butanediols, hexanetriols, glycerol, and pentaerythritol, and from alcohols having aromatic nuclei, or they may be derived from phenols such as 2,2-bis(4-hydroxyphenyl)propane, bis(4-hydroxyphenyl)methane, and novolacs, containing more than two phenolic nuclei per average molecule, obtained from phenol and formaldehyde.

If desired, a mixture of epoxide resins or of an epoxide resin with a monoepoxide such as a glycidyl ether of an aliphatic alcohol having up to eight carbon atoms or of a monohydric phenol having up to eight carbon atoms or a glycidyl ester of mixed branched, aliphatic, tertiary monocarboxylic acids having up to twelve carbon atoms may be used.

The preferred epoxide resins are polyglycidyl ethers of polyhydric phenols or of polyhydric alcohols.

Suitable curing agents which may be used with these epoxide resins are well known, and include aliphatic, cycloaliphatic, aromatic, and heterocyclic amines, polyaminoamides, and adducts of these amines or aminoamides with mono- or polyepoxides, also polyhydric phenols, phosphoric acid, polythiols, and polycarboxylic acids and their anhydrides. Accelerators for the curing reaction may also be incorporated. Curing may take place at ambient or elevated temperatures, but for ease of application a composition which cures at room temperature is preferred.

In addition, the compositions may contain electrically nonconductive fillers, extenders, flow control agents, pigments, and plasticisers which improve the physical properties of the uncured and cured composition. This invention is particularly suitable for making terrazzo floors, which may be produced by including 40 to 70% of marble chippings, calculated on the total volume of the composition.

The following Examples illustrate the invention.

Epoxide Resin I denotes the diglycidyl ether of 2,2-bis(4-hydroxyphenyl) propane having an epoxide content of 5.0–5.2 equiv./kg.

Epoxide Resin II denotes a mixture of 100 parts by weight of Epoxide Resin I and 15 parts by weight of iso-octyl glycidyl ether.

Curing Agent I denotes a mixture of 20 parts by weight of mixed 2,2,4- and 2,4,4-trimethylhexamethylenediamines and 40 parts by weight of furfuryl alcohol.

To prepare a polyurethane resin there were used:

Polyol I, a branched polyol having ester and ether groups in the chains, its hydroxyl group content being 5% (obtained as "Desmophen 1150"), Isocyanate I, an aromatic isocyanate having a —NCO content of 30% (obtained as "Desmodur VL"), and Drying Agent I, a molecular sieve drying agent (obtained as "Zeolite T paste").

The "Desmophen", "Desmodur", and "Zeolite T paste" were obtained from Bayer Chemicals Limited, Richmond, Surrey, England.

To prepare a polyester resin there were used:

Polyester I, a 70% w/v solution of an unsaturated polyester coating resin in styrene, Polyester II, a 65% w/v solution of an unsaturated long chain polyester resin in styrene, and Catalyst I, a 50% w/v solution of ethyl methyl ketone peroxide in di-n-butyl phthalate.

Polyester I and Polyester II were obtained under the designation Roskydal 500B and Roskydal E70, respectively, from Bayer Chemicals Limited.

EXAMPLE 1

Epoxide Resin I (280 ml), 96.5 ml of Epoxide Resin II, 14.5 g of stainless steel fibre (average diameter 12 $\mu$m, average length 3 mm), and 300 g of marble flour (111 ml) were dispersed on a high speed disperser, avoiding excessive inclusion of air.

Separately, 900 g of marble flour (333 ml), 40 g of green chromic oxide (8 ml), 2000 g of 6.5 mm marble chips (738 ml), and 1000 g of 3.2 mm marble chips (369 ml) were mixed. The two mixtures were combined in a Hobart mixer and, when evenly mixed, 254 ml of Curing Agent I was added and mixing was continued until an even consistency was obtained.

This mixture was applied by means of a trowel to a clean, dry, non-dusty concrete surface at a thickness greater than 6.5 mm, allowed to cure at ambient temperature for one day, then abraded to a high polish terrazzo finish having a nominal thickness of 6.5 mm.

The electrical resistance of this surface was measured with an insulation testing ohm-meter having an open circuit voltage of 500 volts DC, using electrodes as stipulated in the Technical Memorandum cited above, i.e., placed 600 mm apart and each weighing about 1 kg, having a flat dry contact area of 2500 sq. mm, and comprising a surface of aluminium foil backed by rubber. The test was repeated in different locations and in each case the resistance was between 80 k$\Omega$ and 500 K$\Omega$.

EXAMPLE 2

Example I was repeated, using 5 g of stainless steel fibres of average diameter 12 $\mu$m and average length 6.5 mm. The resistance of the resultant surface, measured as described in Example I, was within the range 50 k$\Omega$ to 2M$\Omega$.

EXAMPLE 3

Example 1 was repeated, replacing the fibres used in that Example by 37 g of stainless steel fibres of average diameter 12 $\mu$m and an average length of 1.5 mm. The rheological properties of the uncured mixture, containing such very short lengths of fibre, were such that the mixture was very difficult to apply by means of a trowel, but in all other respects the composition was fully satisfactory. The average resistance of the resultant cured surface, measured as described in Example 1, was 1 M$\Omega$.

EXAMPLE 4

Example 1 was repeated, replacing the fibres used in that Example by 2.8 g of stainless steel fibres of average diameter 12 $\mu$m and of average length 10 mm. The average resistance of the resultant surface, measured as described in Example 1, was 50 k$\Omega$. However, due to the use of longer fibres, large variations between individual readings were noticed.

EXAMPLE 5

Epoxide Resin I (100 g, 84.8 ml), 3.5 g of stainless steel fibre (average diameter 12 μm, average length 3 mm) and 200 g of dried, graded sand (80 ml) were mixed together, avoiding excessive inclusion of air. When the composition was evenly mixed, 60 g of Curing Agent I (57.7 ml) was added, followed by 800 g of dried, graded sand (320 ml) and 100 g of micronised $Fe_2O_3$ (19.6 ml). Mixing was continued until an even consistency was obtained. The mixture was applied to a concrete surface at a thickness greater than 6.5 mm, and allowed to cure at ambient temperature for one day. It was then abraded to obtain a smooth finish, the coating having a nominal thickness of 6.5 mm. The average resistance of the resultant surface, tested by the method described in Example 1, was between 80 kΩ and 500 kΩ.

EXAMPLE 6

Example 1 was repeated, replacing the fibre used in that Example by 14.5 g of stainless steel fibres having an average length of 3 mm and an average diameter of 8 μm. The average resistance of the resultant surface, measured as described in Example 1, was 300 kΩ.

EXAMPLE 7

Polyol I (485 g, 480 ml), 14.5 g of stainless steel fibres (average diameter 12 μm, average length 3 mm), 110 g of Drying Agent I
I (75 ml), and 300 g of marble flour (111 ml) were dispersed in a high-speed disperser and, separately, 900 g of marble flour (333 ml), 40 g of green chromic oxide (8 ml), 2000 g of 6.5 mm marble chips (738 ml), and 1000 g of 3.2 mm marble chips (369 ml) were mixed together. The two mixtures were combined and, when they were evenly mixed, 230 g of Isocyanate I (188 ml) was added and the mixing was continued until an even consistency was obtained.

The mixture was applied by means of a trowel onto a dry concrete surface, and, after being left for one day at ambient temperature, it was abraded to a high polish terrazzo finish, the layer having a nominal thickness of 6.5 mm. The resistance of the resultant surface, measured as described in Example 1, was within the range 80 kΩ to 500 kΩ.

EXAMPLE 8

Polyester I (560 g, 500 ml), 100 g of Polyester II (89 ml), 5 ml of a cobalt naphthenate solution containing 1% w/v Co, 14.5 g of stainless steel fibres (average diameter 12 μm, average length 3 mm) and 300 g of marble flour (111 ml) were dispersed in a high-speed disperser, and, separately, 900 g of marble flour (333 ml), 40 g of green chromic oxide (8 ml), 2000 g of 6.5 mm marble chips (738 ml), and 1000 g of 3.2 mm marble chips (369 ml) were mixed. The two mixtures were combined and, when they were evenly mixed, 21 g of Catalyst I (20 ml) was added and mixing was continued until an even consistency was obtained.

The mixture was applied to a concrete surface, allowed to cure for 24 hours, then abraded as described in Example 1. The resistance of the resultant surface, measured as described in Example 1, was within the range 80 kΩ to 500 kΩ.

I claim:
1. An electrically conductive composition comprising a curable synthetic resin and at least 1 g and at most 20 g, per liter of total composition, of metal fibers of niobium, nickel, tungsten, iron, aluminum, carbon steel, chrome-nickel or stainless steel, substantially all the said fibers having a length of at least 1.5 mm and at most 10 mm and an average diameter of at least 8 μm and at most 15 μm.

2. A composition according to claim 1, which contains at most 12 g of said metal fibers per liter of the total composition.

3. A composition according to claim 1, which contains at least 4 g and at most 8 g of said metal fibers per liter of the total composition.

4. A composition according to claim 1, wherein substantially all the said fibers have a length of at least 2.0 mm and at most 4.0 mm.

5. A composition according to claim 1, wherein the synthetic resin is a cold-curing polyester, polyurethane, or polyepoxide.

6. A composition according to claim 1, which contains at least 40% and at most 70% of marble chippings, calculated on the total volume of the composition.

7. An electrically conductive surface comprising a cured synthetic resin composition containing at least 1 g and at most 20 g, per liter of total composition, of metal fibers of niobium, nickel, tungsten, iron, aluminum, carbon steel, chrome-nickel, or stainless steel, substantially all of said fibers having a length of at least 1.5 mm and at most 10 mm and an average diameter of at least 8 μm and at most 15 μm.

8. A surface according to claim 7, which contains at most 12 g of such metal fibers per liter of total composition.

9. A surface according to claim 7, which contains at least 4 g and at most 8 g of such metal fibers per liter of total composition.

10. A surface according to claim 7, which has an average electrical resistance of at least 50 kΩ and at most 2 MΩ, measured between two electrodes placed 600 mm apart.

11. A surface according to claim 7, which is a terrazzo flooring.

* * * * *